United States Patent
Schober et al.

(10) Patent No.: US 9,126,603 B2
(45) Date of Patent: Sep. 8, 2015

(54) VEHICLE COMPONENT HAVING A RECESS OVERFLOWED WITH AIR

(75) Inventors: Martin Schober, Berlin (DE);
Alexander Orellano, Berlin (DE);
Andreas Tietze, Berlin (DE); Christian Segieth, Berlin (DE); Andre Schitthelm, Berlin (DE); Marco Weise, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 107 days.

(21) Appl. No.: 13/821,858

(22) PCT Filed: Sep. 7, 2011

(86) PCT No.: PCT/EP2011/065499
§ 371 (c)(1),
(2), (4) Date: May 29, 2013

(87) PCT Pub. No.: WO2012/032096
PCT Pub. Date: Mar. 15, 2012

(65) Prior Publication Data
US 2013/0239844 A1    Sep. 19, 2013

(30) Foreign Application Priority Data

Sep. 10, 2010  (DE) .......................... 10 2010 044 933
Sep. 19, 2010  (DE) .......................... 10 2010 045 632
Sep. 21, 2010  (EP) ..................................... 10178094

(51) Int. Cl.
*B61D 17/02* (2006.01)

(52) U.S. Cl.
CPC . *B61D 17/02* (2013.01); *Y02T 30/32* (2013.01)

(58) Field of Classification Search
USPC ........................................................ 105/1.2
See application file for complete search history.

(56) References Cited

U.S. PATENT DOCUMENTS

| | | | | |
|---|---|---|---|---|
| 2,093,535 A | * | 9/1937 | Adams et al. .................. | 105/1.1 |
| 4,455,045 A | * | 6/1984 | Wheeler .................... | 296/181.5 |
| 4,756,256 A | * | 7/1988 | Rains et al. .................... | 105/1.1 |
| 5,078,448 A | * | 1/1992 | Selzer et al. ............... | 296/180.2 |
| 8,479,658 B2 | * | 7/2013 | Langerwisch et al. ......... | 105/1.1 |
| 2011/0297035 A1 | * | 12/2011 | Langerwisch et al. ......... | 105/1.1 |
| 2013/0133545 A1 | * | 5/2013 | Schober et al. .................. | 105/1.1 |
| 2013/0239844 A1 | * | 9/2013 | Schober et al. ................. | 105/1.2 |
| 2013/0291758 A1 | * | 11/2013 | Orellano et al. ............... | 105/1.1 |
| 2013/0291759 A1 | * | 11/2013 | Orellano et al. ............... | 105/1.1 |
| 2014/0238261 A1 | * | 8/2014 | Hidai et al. ..................... | 105/1.2 |

FOREIGN PATENT DOCUMENTS

| | | |
|---|---|---|
| CN | 1634735 A | 7/2005 |
| DE | 2907910 A1 | 3/1980 |

(Continued)

*Primary Examiner* — Jason C Smith

(74) *Attorney, Agent, or Firm* — The Webb Law Firm

(57) ABSTRACT

A vehicle component includes first and second surfaces, in a first travel direction of the vehicle. The first surface is exposed to an air flow having a local main flow direction. In a region of a recess on the vehicle, the first surface forms a flow separation edge where the air flow is deflected from the first surface. The recess is delimited by a leading first wall facing the local main flow direction and a trailing second wall. The flow separation edge extends transversely to the local main flow direction over a majority of a transverse dimension of the recess. In the local main flow direction, the second surface borders on the flow separation edge and forms a part of the first wall. The second surface is disposed so that it is inclined like a chamfer about an acute angle of inclination relative to the local main flow direction.

13 Claims, 4 Drawing Sheets

(56) References Cited

FOREIGN PATENT DOCUMENTS

| | | |
|---|---|---|
| DE | 102004041090 A1 | 3/2006 |
| EP | 0008147 A1 | 2/1980 |
| EP | 0057765 A1 | 8/1982 |
| JP | 201076619 A | 4/2010 |

* cited by examiner

VEHICLE COMPONENT HAVING A RECESS OVERFLOWED WITH AIR

The present invention relates to a vehicle component for a vehicle, in particular a rail vehicle for high speed traffic, comprising a first surface and a second surface, wherein the first surface, in a first operating mode of the vehicle in a first travel direction, is exposed to an air flow induced by the relative wind and having a local main flow direction. The first surface, in the region of a recess on the vehicle, forms a flow separation edge on which the air flow separates from the first surface at a nominal operating speed of the vehicle, wherein the recess is delimited by a leading first wall leading in the local main flow direction and a trailing second wall and the flow separation edge extends at least over the majority of a transverse dimension of the recess transverse to the local main flow direction. The second surface is located adjacent to the flow separation edge in the local main flow direction and forms at least a part of the first wall. The invention further relates to a vehicle with a vehicle component of this type.

In modern rail vehicles with comparatively high nominal operating speeds, there is generally the problem that, in the region of recesses or cross-sectional jumps on the outer shell or outer skin of the vehicle, a separation of the flow from the vehicle components arranged there occurs. This leads to the formation of a continuously expanding turbulent shear layer downstream of the separation point, which increases the flow resistance of the vehicle. On the trailing end of the recess or the cross-sectional jump, the shear layer hits the outer skin again, wherein, after a certain distance, a flow reattached to the outer skin with a boundary layer is then formed again.

The extent of the increase in the flow resistance by a temporary separation of the flow of this type at cross-sectional jumps of this type depends among other things on the expansion of the shear layer transverse to the flow direction and the distance to the complete reattachment of the flow to the outer skin of the vehicle. In particular cases, in which the shear layer, at the trailing end of the recess, hits a trailing wall of the recess, this leads to an increase in the turbulence in the shear layer and therefore to a delay in the reattachment of the flow and a corresponding increase in the flow resistance of the vehicle. A further negative effect is the increased sound emission which can occur in this way in these regions.

In order to keep the expansion of the shear layer as low as possible, it is recommended to achieve a separation of the flow which is as clearly defined as possible in the region of a correspondingly pronounced flow separation edge on the leading end of a recess of this type. However, if the vehicle is operated in both travel directions, as is the case in the overwhelming majority of modern rail vehicles, there is also a conflict of goals in that the section which forms the pronounced flow separation edge on the leading end of the recess during operation in the one travel direction is arranged on the trailing end of the recess in the other travel direction and can there lead to the complications described above on impact with the shear layer.

Furthermore, on the lower side of the vehicle there is the problem that the highly turbulent shear layer stirs up the ballasts in the track bed or other objects, leading to so-called ballast flight which can cause damage to the underside of the vehicle, the surrounding infrastructure or, in the worst case scenario, can even put passers-by at risk.

In relation to the problem of ballast flight, document DE 10 2004 041 090 A1 suggests to cover the majority of the running gear section and the underside of the bogie with shielding elements. On the one hand, this would protect the running gear components from objects striking them and, on the other, eventually, to achieve a decrease in the travel distance of the shear layer. However, shieldings of this type are associated with comparatively high effort as they must guarantee the necessary relative movements between the bogie and the wagon body.

The object of the present invention is therefore to provide a vehicle component for a vehicle of the above mentioned type which does not have the above mentioned disadvantages or has them at least to a lesser degree and, in particular, enables in a simple manner, during operation in both travel directions, a flow resistance which is as low as possible and a noise emission of the vehicle which is as low as possible and, eventually, a reduction in the risk of ballast flight.

The present invention achieves this object on the basis of a vehicle component in accordance with the preamble of claim 1 by the features given in the characterising part of claim 1.

The present invention is based on the technical teaching that, in a two-direction operation, it is possible to achieve a flow resistance which is as low as possible and a noise emission of the vehicle which is as low as possible in a simple manner and, eventually, a reduction of the risk of ballast flight by the second surface being arranged inclined with respect to the local main flow direction or the first surface in the manner of a chamfer about an acute angle of inclination. This angled shape of the surface in the wake of the flow separation edge can achieve in an advantageous manner a pronounced flow separation edge which ensures a clean, defined separation of the flow from the surface. This in turn is advantageous in terms of a low level of expansion of the shear layer (in a direction perpendicular to the plane of main extension of the shear layer) and therefore a low flow resistance.

A further advantage of this angled shape is that, when travelling in an opposite second travel direction, a shear layer which then comes from the direction of the second wall does not impinge on a surface which is substantially aligned perpendicular to the direction of impact as with conventional designs, but rather impinges on the second surface which is aligned correspondingly less sharply inclined to the direction of impact. This has the advantage that a lower impulse is introduced into the impacting shear layer such that the flow can more rapidly reattach to the surface and form a low-resistance boundary layer.

Depending on the size of the angle of inclination between the first surface and the second surface, flow over the separation edge (which in the case of this opposite travel direction is in the opposite direction from the second surface to the first surface) may lead to a further local or temporary separation (in the form of a so-called separation bubble), however, compared to conventional designs, this occurs to a lesser extent due to the more favourable inclination between the first and the second surface. In other words, the present invention reduces the angle of impact of the shear layer on the surface such that it leads to a smoother impact of the shear layer on the surface, which facilitates the rapid reattachment of the flow to the surface and therefore results in a reduction of the flow resistance. A further advantage of this smoother angle of impact on the surface is in the lower level of noise emission which is associated with it.

Consequently, with the present invention the above mentioned conflict of goals in terms of an aerodynamically optimised design of the leading and trailing edge regions in a recess over which air flows on a vehicle operated in two directions is solved.

According to one aspect, the present invention therefore relates to a vehicle component for a vehicle, in particular a rail vehicle for high speed traffic, with a first surface and a second surface, wherein the first surface, in a first operating mode of the vehicle with a first travel direction, is exposed to an air flow induced by the relative wind and having a local main flow direction. The first surface, in the region of a recess on the vehicle, forms a flow separation edge at which the air flow separates from the first surface at a nominal operating speed of the vehicle. The recess is delimited by a first wall running in the local main flow direction and a trailing second wall, wherein the flow separation edge extends least over the majority of a transverse dimension of the recess transverse to the local main flow direction. The second surface in the local main flow direction is located adjacent to the flow separation edge and forms at least a part of the first wall. Furthermore the second surface is arranged inclined in the manner of a chamfer about an acute angle of inclination relative to the local main flow direction.

The angle of inclination is preferably determined in a normal plane which is defined by the first surface and the local main flow direction in each of the regions in question. So, in the region of the flow separation edge, the first surface defines a local first tangent plane and a local surface normal while, in the region of the flow separation edge, the second surface defines a second local tangent plane. The local surface normal together with the local main flow direction then defines a local normal plane, wherein the local second tangent plane, in the local normal plane, is then inclined about the angle of inclination relative to the local first tangent plane.

The size of the angle of inclination between the second surface and the local main flow direction or the first surface, respectively, can in principle be selected to be of an arbitrary size, provided it is ensured that (during operation in the first travel direction) the second surface, in the wake of flow separation edge, kinks or drops in such an acute or cliff-like manner relative to the local main flow direction (which is defined by the first surface in the region adjacent to the barrier) that the air flow (at least at the nominal operating speed of the vehicle) is not able to follow this rapid change in direction of the surface over which it is flowing and, therefore, permanently separates from the surface.

This rapid change in direction of the surface along the local main flow direction in the near-boundary-layer-region can be achieved in an arbitrary suitable way by a corresponding shape of the outer skin of the vehicle component. It should be noted here that the outer skin does not necessarily have to follow the local main flow direction at every point. Rather, local deviations of the sectional contour of the outer skin from this local main flow direction are possible (which, for example, are caused by irregularities in the outer skin in the form of local ribs, edges or indentations), in the region of which the boundary layer and, eventually, the near-boundary-layer-region of the flow have a direction which is different to the local main flow direction. It is only necessary for these local deviations not to have an effect on the global flow direction of the flow (therefore on the main flow direction) in the near-boundary-layer-region.

In preferred variants of the invention, the angle of inclination is 10° to 80°, preferably 30° to 60°. Particularly advantageous results are achieved if the angle of inclination is 40° to 50°, in particular substantially 45°, as this achieves a particularly advantageous relationship between the rapid change in direction of the surface during flow separation on the leading edge of the recess and as smooth as possible an impact of the shear layer on the trailing edge of the recess.

An essential influencing factor for the longitudinal dimension of the kinking (from the point of view of the flow, with a given angle of inclination or course of the angle of inclination, respectively) second surface in the local main flow direction is the free flow distance of the shear layer between the leading first edge and the trailing second edge of the recess in the local main flow direction. The larger this distance is, the larger the expansion of the shear layer transverse to its plane of main extension and the further a part of the shear layer penetrates into the recess.

If the shear layer impacts the second surface in the opposite travel direction, the longitudinal dimension thereof should preferably be selected such that, at the given angle of inclination or course of the angle of inclination, respectively, the second surface extends so far into the recess that at least 50%, preferably at least 70%, more preferably at least 90%, in particular substantially 100% of the part of the shear layer which penetrates into the recess impinges on the second surface. This ensures in an advantageous manner that a part which is as large as possible, preferably the entire part, of the shear layer which is flowing into the recess impinges on the favourably aligned second surface.

In further preferred embodiments of the vehicle component according to the invention, this can also be achieved by the recess, in the local main flow direction and in the local normal plane, having a maximum first longitudinal dimension between the flow separation edge and the second wall and the second surface, in the local normal plane and in the local main flow direction, extending over a second longitudinal dimension, the second longitudinal dimension being 1% to 30% of the first longitudinal dimension, preferably 3% to 15% of the first longitudinal dimension, more preferably 5% to 10% of the first longitudinal dimension.

It will be appreciated that the second longitudinal dimension can deviate from this, provided that, transverse to the local main flow direction, there is a difference in level between the first edge of the recess (in the region of the first wall) and the second edge of the recess (in the region of the second wall). If the second edge is at a higher level than the first edge, this means that a smaller proportion of the shear layer penetrates into the recess such that, eventually, a smaller second surface is sufficient to collect this smaller proportion completely. If the opposite is true (the first edge is at a higher level), a longer second surface must be provided in order to achieve the desired effect.

Further preferred variants of the vehicle component according to the invention provide for the recess, in the local normal plane and perpendicular to the local main flow direction, having a maximum first depth dimension starting from the flow separation edge and the second surface, in the local normal plane and perpendicular to the local main flow direction, extending over a second depth dimension starting from the flow separation edge, said second depth dimension being 1% to 40% of the first depth dimension, preferably 5% to 30% of the first depth dimension, more preferably 10% to 20% of the first depth dimension. This can also achieve configurations in which at least a majority of the proportion of the shear layer penetrating into the recess can be collected by the second surface in the manner described.

The second surface can in principle have any shape, in particular any sectional contour, provided that (from the perspective of the flow) a sufficiently rapid and cliff-like change in direction is achieved in the manner described above, which change in direction cannot be followed by the flow in the wake of the flow separation edge. The second surface, at least in sections, can have a substantially straight sectional contour in the local normal plane. For example, one single straight sectional contour can be provided likewise as a sectional contour which is polygonal in one or more sections. Additionally or alternatively, the second surface, at least in sections, can have a curved sectional contour in the local normal plane. Here, the sectional contour of the second surface can, in particular, be convex in shape in order to achieve, over a comparatively short second longitudinal dimension, a high penetration depth into the recess at an angle of inclination given in the region of the flow separation edge.

The flow separation edge can in principle have any suitable shape provided a defined, clean separation of the flow is achieved. The flow separation edge preferably has sharp edges, wherein the radius of curvature of the first surface, in the region of the flow separation edge in the local normal plane, is in particular a maximum of 20 mm, preferably a maximum of 10 mm, more preferably a maximum of 5 mm, more preferably a maximum of 2 mm, as this means that a particularly clean separation of the flow can be achieved.

As already mentioned, the flow separation edge extends over a majority of the transverse dimension of the recess. The flow separation edge therefore preferably extends over at least 50% of the transverse dimension of the recess, preferably over at least 70% of the transverse dimension of the recess, more preferably over at least 90% of the transverse dimension of the recess, in particular over substantially 100% of the transverse dimension of the recess. In this way, the positive effects described can be used in as comprehensive a manner as possible.

In principle, it can be provided that the second surface extends up to the base of the recess in the direction of the depth dimension of the recess (transverse to the main flow direction). In preferred, space-saving variants of the vehicle component according to the invention, in the local main flow direction, a third surface follows the second surface, wherein the third surface is more strongly inclined with respect to the local main flow direction than the second surface.

The transition between the second and third surfaces can, in principle, be of any shape. However, the third surface, preferably, has a smooth transition to the second surface which, at least in sections, is curved and/or, at least in sections, is straight. This is advantageous in particular if not all of the proportion of the shear layer flowing into the recess impinges on the second surface. In this case, this transition achieves a correspondingly perturbation-free forwarding of the proportion of the shear layer not directly impinging on the second surface. Particularly favourable flow conditions result if the third surface, at least in sections, has a convex transition to the second surface.

The recess, transverse to the local main flow direction, does not necessarily have to be confined by a wall. In certain embodiments of the invention, however, a fourth surface is provided which is located adjacent to the third surface and forms a delimitation of the recess in a depth direction of the recess.

The advantages described above can be achieved to a particularly great extent or in each operating condition if also the second edge of the recess, trailing in the first operating condition, is shaped accordingly. A fifth surface and a sixth surface are therefore preferably provided in the region of the second wall, wherein the fifth surface is formed such that, in a second operating mode of the vehicle in a second travel direction opposite to the first travel direction, it corresponds to the shape and function of the first surface and the sixth surface, in the second operating mode, is formed such that it corresponds to the second surface in terms of shape and function.

In other words, in this case the fifth surface has the above mentioned features of the first surface and the sixth surface has the above mentioned features of the second surface, such that, insofar, reference is here only made to the explanations given above.

The angle of inclination between the first surface and the second surface is a first angle of inclination and the sixth surface in turn is arranged inclined in the manner of a chamfer about an acute second angle of inclination to the fifth surface. Here, the second angle of inclination can be, in particular, 10° to 80°, preferably 30° to 60°, more preferably 40° to 50°, in particular substantially 45° in order to achieve the above mentioned advantages.

In principle, it can be provided that the fifth and sixth surfaces are shaped in the same manner as the first and second surfaces, in particular, that they are symmetrical to the first and second surfaces. In preferred variants of the invention, however, an asymmetric shape is provided, wherein the second angle of inclination, in particular, is smaller than the first angle of inclination. In particular, it can be provided that the second angle of inclination is preferably by 5° to 55°, more preferably by 10° to 35°, more preferably by 15° to 20°, smaller than the first angle of inclination.

This can be meaningful, in particular, if the vehicle component is provided near to an end of a comparatively long vehicle. If this end, in the first operating mode with the first travel direction, forms the leading end of the vehicle the clean separation of the flow on the leading first edge of the recess is particularly important in terms of a low flow resistance and a low noise emission, as is a smooth and rapid reattachment of the flow at the trailing second edge of the recess, such that a second angle of inclination which is as low as possible in the region of the second edge is advantageous. In the second operating mode with an opposite travel direction, the recess is then located at the trailing end of the vehicle, where, due to the length of the vehicle, there is already a comparatively wide boundary layer around the vehicle, which reduces the above mentioned problems with air flowing over a recess of this type, such that, in particular, the steep arrangement of the second surface plays a less significant role upon impact of the flow.

The vehicle component can in principle be any component of the vehicle, in the region of which a corresponding recess over which air will flow is provided. The recess can, for example, be a running gear cutout of a wagon body of the vehicle.

Alternatively, the recess may be a handle cavity in a side wall of a wagon body of the vehicle, wherein, in particular, a handle rod is provided in the handle cavity in a retraced arrangement. This handle rod is then preferably arranged retracted so far into the recess that it does not interfere with the shear layer.

Alternatively, the recess may be an indentation in a roof region of a wagon body of the vehicle. For example, the indentation may be provided to receive a component of a power supply unit of the vehicle, in particular a pantograph.

The recess may also be a notch in an outer skin of the vehicle at a transition between two wagon bodies of the vehicle. It is in particular possible here that the first surface and the second surface are formed on a protrusion of a wagon body in a longitudinal direction of the vehicle. This enables, for example, simple retrofitting of these protrusions on existing vehicles.

In further variants of the invention, the recess is a gap between two add-on elements, in particular two roof containers or two underfloor containers, on at least one wagon body of the vehicle. The recess may also be a gap between a wagon body of the vehicle and an running gear of the vehicle.

Finally, the present invention can also be used on an running gear of the vehicle. Preferably the vehicle component is then an running gear of the vehicle.

The present invention further relates to a vehicle with a vehicle component according to the invention. This is preferably a vehicle for high speed traffic with a nominal operating speed above 250 km/h, in particular above 300 km/h, in particular between 320 km/h and 390 km/h, as the advantages of the invention have a particular good effect here.

Other preferred configurations of the invention become apparent from the dependent claims and/or the following description of preferred embodiments, which refers to the appended drawings, in which:

First Embodiment

Figure 1:
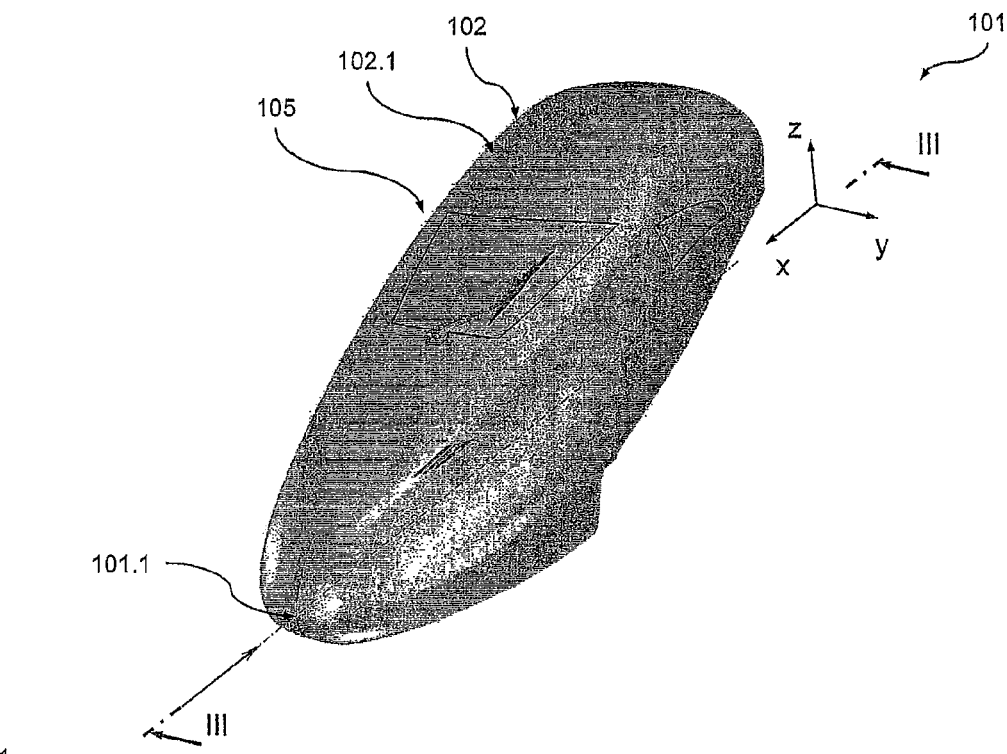
FIG. 1 is a schematic perspective view of a part of a preferred embodiment of the vehicle according to the invention with a preferred embodiment of a vehicle component according to the invention.

In the following, a preferred embodiment of the vehicle according to the invention in the form of a rail vehicle 101 will be described with reference to FIGS. 1 to 4. The rail vehicle 101 is an end wagon of a multiple unit for high speed traffic with a nominal speed above 250 km/h, namely $v_n$=380 km/h.

It is noted here that, unless explicitly stated otherwise, the following statements are made for a flow state during operation of the vehicle 101 at a constant speed on a straight, level track without the influence of side wind or the like. It is understood that a deviation from this operating state (for example due to negotiation of a curve or side wind etc.) can result in deviations from the described flow conditions, in particular the flow directions, wherein however the basic statements substantially continue to apply.

The vehicle 101 comprises a wagon body 102 which defines an outer skin 102.1 of the vehicle 101. The two ends of the wagon body 102 are supported on an running gear in the form of a bogie in a conventional manner. However, it is understood that the present invention can also be used in combination with other configurations, in which the wagon body is only supported on an running gear.

For an easier understanding of the following explanations, the Figures show a vehicle coordinate system x,y,z (specified by the wheel contact plane 103.1 of the bogie 103), in which coordinate system the x coordinate is the longitudinal direction of the rail vehicle 101, the y coordinate is the transverse direction of the rail vehicle 101 and the z coordinate is the height direction of the rail vehicle 101.

The wagon body 102 has a body section 104 and an adjoining head section 105, showing a preferred embodiment of the vehicle component according to the invention. In a first operating mode with a first travel direction, the head section 105 forms the leading end of the train 101, while, in a second operating mode with a second travel direction opposite to the first travel direction, it forms the trailing end of the train 101.

The body section 104 (apart from local recesses for functional components of the vehicle, such as pantographs, roof containers etc.) has a substantially prismatic shape (with a substantially identical sectional contour of the outer skin 102.1 along the longitudinal direction of the vehicle).

In contrast to this, the head section 105 tapers both in the height direction of the vehicle and in the transverse direction of the vehicle towards the end of the vehicle 101 such that, during operation of the vehicle 101, it can form a free vehicle end of the vehicle 101. A compartment for the vehicle driver is provided in the head section 105, from which the driver controls the vehicle 101 when the head section 105, during normal operation of the vehicle 101, forms the leading end 101.1 of the vehicle 101 (the travel direction facing in the direction of the positive x-axis, which is assumed in the following unless specified otherwise).

The bogie 103 is arranged in a recess in the form of a running gear cutout 106 of the wagon body 102 which is delimited, in the first operating mode, on its leading end by a leading wall 106.1 and on its trailing end by a trailing wall 106.2 which are connected to one another by means of an upper wall 106.3. On the two running gear sides, the running gear cutout 106 is delimited by aprons 106.4.

In the first operating mode, the outer skin 102.1 of the wagon body 102, at the lower end of the leading wall 106.1, forms a separation region in the form of a first flow separation edge 107, at which the air flow (flowing along the underside 102.2 of the wagon body 102 from the free vehicle end to the running gear cutout 106), at the nominal operating speed of the vehicle 101 (but also at travel speeds below this), separates from the outer skin 102.1, in other words the surface of the wagon body 102, thereby forming a shear layer 108.

In the first operating mode, a first surface 109.1 of the outer skin 102.1 upstream of the flow separation edge 107 is exposed to an air flow induced by the relative wind and having a first main local flow direction 111. The first surface 109.1 forms the flow separation edge 107, which is followed by a second surface 109.2 of the first wall 106.1.

In order to achieve a clean, defined separation of the flow at the flow separation edge 107, the second surface 109.2 is arranged inclined to the local main flow direction 111 in the manner of a chamfer by an acute first angle of inclination α. The angle of inclination is determined in a normal plane which is defined by the first surface 109.1 and the local main flow direction 111 in the respective region in question. So, in the present example, the first surface 109.1 defines a local first tangent plane (which extends perpendicular to the drawing plane in FIG. 3 and coincides with the first surface 109.1 extending in a straight manner at this location) in the region of the flow separation edge 107 and a local surface normal 110 (which runs perpendicular to the local first tangent plane). This local surface normal 110 in combination with the local main flow direction 111 in turn defines said local normal plane (corresponding to the sectional plane or drawing plane, respectively, in FIG. 3).

Figure 3:
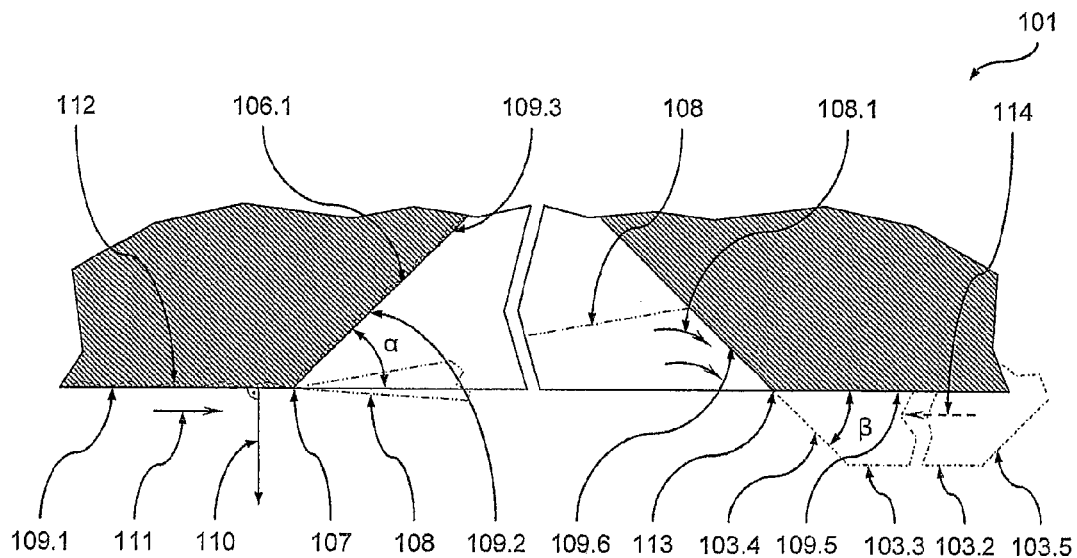
FIG. 3 is a schematic sectional view of a part of the vehicle in the region of the vehicle front along the line III-III from FIG. 1.

The second surface 109.2, in turn, defines a local second tangent plane (which also runs perpendicular to the drawing plane in FIG. 3 and coincides with the second surface 109.2 extending in a straight manner at this location). This local second tangent plane, in the local normal plane, is inclined about the first angle of inclination a relative to the local first tangent plane.

The size of the angle of inclination α between the second surface 109.2 and the local main flow direction 111 or the first surface 109.1, respectively, can in principle be selected to be of arbitrary size provided that it is ensured that (during operation in the first travel direction) the second surface 109.2 trailing the flow separation edge 107 kinks or drops in such a sharp or cliff-like manner relative to the local main flow direction 111 (which is defined by the first surface 109.2 in the near-boundary-layer-region) that the air flow (at least at the nominal operating speed of the vehicle) is not able to follow this rapid change in direction of the surface 102.1 over which air is flowing and, therefore, permanently separates from the surface 102.1.

This rapid change in direction of the surface 102.1 along the local main flow direction 111 in the near-boundary-layer-region can be achieved in any suitable manner by means of a corresponding shape of the outer skin 102.1. It should be noted here that the outer skin 102.1 does not necessarily have to follow the local main flow direction 111 at every point.

Rather, local deviations of the sectional contour of the outer skin 102.1 from this local main flow direction 111 are possible (which, for example, are caused by irregularities in the outer skin in the form of local ribs, edges or indentations etc. and are indicated by the dotted contour 112 in FIG. 3), in the region of which deviations the boundary layer and, eventually, the near-boundary-layer-region of the flow have a direction which is different to the local main flow direction 111. It is only necessary for these local deviations not to have an overall effect on the local flow direction 111 of the flow (therefore on the main flow direction) in the near-boundary-layer-region.

In the present example, the first angle of inclination is $\alpha=45°$, as this, downstream of the flow separation edge 107 and in relation to the local main flow direction 111, achieves a sufficiently sharp or cliff-like drop or kink in the surface 102.1 over which the air flows, such that the flow is not able to follow this rapid change in direction of the surface 102.1 over which the air flows and, accordingly, a clean flow separation is achieved which causes a low expansion of the shear layer in the normal plane (shown in FIG. 3) and the associated advantages in terms of low flow resistance.

In the local main flow direction 111, a third surface 109.3 of the leading wall 106.1 follows the second surface 109.2. In the present example, this third surface 109.3 has the same inclination relative to the main flow direction 111. It is understood, however, that in other variants of the invention a different inclination may also be provided. The third surface 109.3 passes into a fourth surface 109.4 formed by the upper, third wall 106.3 of the running gear cutout 106.

At the trailing end of the running gear cutout 106 the outer skin 102.1 forms a fifth surface 109.5 and a sixth surface 109.6. As can be seen from FIG. 3, in particular, the fifth surface 109.5 and the sixth surface 109.6 (relative to a plane of symmetry perpendicular to the main flow direction 111 or 114) are arranged symmetrical to the first surface 109.1 or the second surface 109.2.

In other words, this shape of the fifth surface 109.5 and the sixth surface 109.6 means that, when the travel direction is reversed in the second operating mode of the vehicle 101, the fifth surface 109.5 takes on the role and function of the first surface 109.1, while the sixth surface 109.6 takes on the role and function of the second surface 109.2, such that reference is here made to the above explanations relating to the first and second surfaces 109.1, 109.2. In detail, the sixth surface 109.6 is also arranged inclined in the manner of a chamfer in the normal plane about an acute second angle of inclination $\beta=\alpha=45°$ relative to a second local main flow direction 114.

The size of the second angle of inclination $\beta$ between the sixth surface 109.6 and the local main flow direction 111 or the fifth surface 109.5, respectively, can also be selected to be of arbitrary size provided that it is ensured that, during operation in the second travel direction, the sixth surface 109.6 trailing the second flow separation edge 113 (which is formed on the transition of the fifth surface 109.5 to the sixth surface 109.6) kinks or drops in such a sharp or cliff-like manner relative to the local main flow direction 114 that the air flow (at least at the nominal operating speed of the vehicle) is not able to follow this rapid change in direction of the surface 102.1 over which air is flowing and, therefore, permanently separates from the surface 102.1.

A particular advantage of this shape with the surface 109.2 or 109.6, respectively, following the flow separation edge 107 or 113, respectively, in the respective local main flow direction 111 or 114, respectively, and kinking in the manner of a chamfer is the fact that, in the respective operating mode in which the surface 109.2 or 109.6, respectively, lies on the trailing end of the running gear cutout 106, the shear layer 108 does not impinge on a surface which is arranged substantially perpendicular to the direction of impact as in conventional designs, but rather impinges on the second surface 109.2 or the sixth surface 109.6, respectively, which is correspondingly less sharply inclined with respect to the direction of impact, as shown in FIG. 3 by arrow 108.1. This has the advantage that a smaller impulse is introduced into the impacting shear layer 108 such that the flow more rapidly reattaches to the surface 102.1 and forms a low resistance boundary layer.

Depending on the size of the angle of inclination $\alpha$ between the first surface 109.1 and the second surface 109.2 or the angle of inclination $\beta$ between the fifth surface 109.5 and the sixth surface 109.6, respectively, the flow of the air over the flow separation edge 107 or 113, respectively, can lead once again to a local or temporary separation (in the form of a so-called separation bubble), the latter is lower than in conventional designs due to the more favourable inclination between the first surface 109.1 and the second surface 109.2 or the fifth surface 109.5 and the sixth surface 109.6, respectively.

In other words, with the present invention, the angle of impact of the shear layer 108 on the surface 102.1 is reduced resulting in a smoother impact of the shear layer 108 on the surface 102.1 which favours a rapid reattachment of the flow to the surface 102.1 and results in a reduction in the flow resistance. A further advantage of this smoother impact of the shear layer 108 on the surface 102.1 is the lower noise emission which is associated with it.

As a result, the above mentioned conflict of goals in terms of an aerodynamically optimised shape of the leading and trailing edge regions of a recess over which air flows on a vehicle which is operated in two directions is advantageously solved by the present invention.

With the angle of inclination $\beta=\alpha=45°$ selected in this example, in the two operating modes, a particularly favourable ratio between a rapid change in direction of the surface 102.1 during flow separation at the respective leading edge 107 or 113, respectively, of the running gear cutout and as smooth an impact as possible of the shear layer 108 on the trailing edge 113 or 107, respectively, of the running gear cutout 106 are achieved. It is understood, however, that in other variants of the invention other angles of inclination can also be selected as described below in connection with further embodiments.

In the present example, the flow separation edges 107 and 113 are substantially straight. It is understood, however, that the flow separation edges, in other variants of the invention, can have any suitable course (e.g. a course which, at least in sections, is straight and/or a course which, at least in sections, is curved).

Furthermore, in the present example, the flow separation edges 107 and 113 extend over approximately 80% of the transverse dimension of the running gear cutout 106 perpendicular to the normal plane in order to achieve the described advantageous influence on the flow over a region which is as large as possible.

The flow separation edge 107 and 113 itself can in principle have any suitable shape provided a defined, clean separation of the flow is achieved. In the present example, the flow separation edge is formed in a sharp edged manner, wherein, in the local normal plane, the radius of curvature of the first surface 109.1 and the fifth surface 109.5, in the present example, is around 5 mm, as this makes it possible to achieve a particularly clean separation of the flow.

In a further embodiment of the invention, as indicated by the dot-dashed contour 103.2, the fifth surface 103.3 and the sixth surface 103.4, in the first operating mode, are arranged at a leading section of a drive motor 103.2 of the bogie 103.

This travel motor 103.2 can, as shown in FIG. 3, be arranged downwardly displaced relative to the wagon body 102 in a direction transverse to the main flow direction 111. It is understood, however, that in other variants of the invention the first surface 109.1 and the fifth surface 103.3 arranged on the drive motor 103.2 can be substantially on the same level or be arranged displaced in the opposite direction.

As can also be seen in FIG. 3, on a section of the drive motor 103.2 which is trailing in the first operating mode, the fifth surface 103.3 forms a further first surface (which further first surface corresponds to the shape and function of the first surface 109.1), while a subsequent further second surface 103.5 is arranged on the drive motor 103.2 (which further second surface, in shape and function, corresponds of the second surface 109.2).

Second Embodiment

Figure 2:
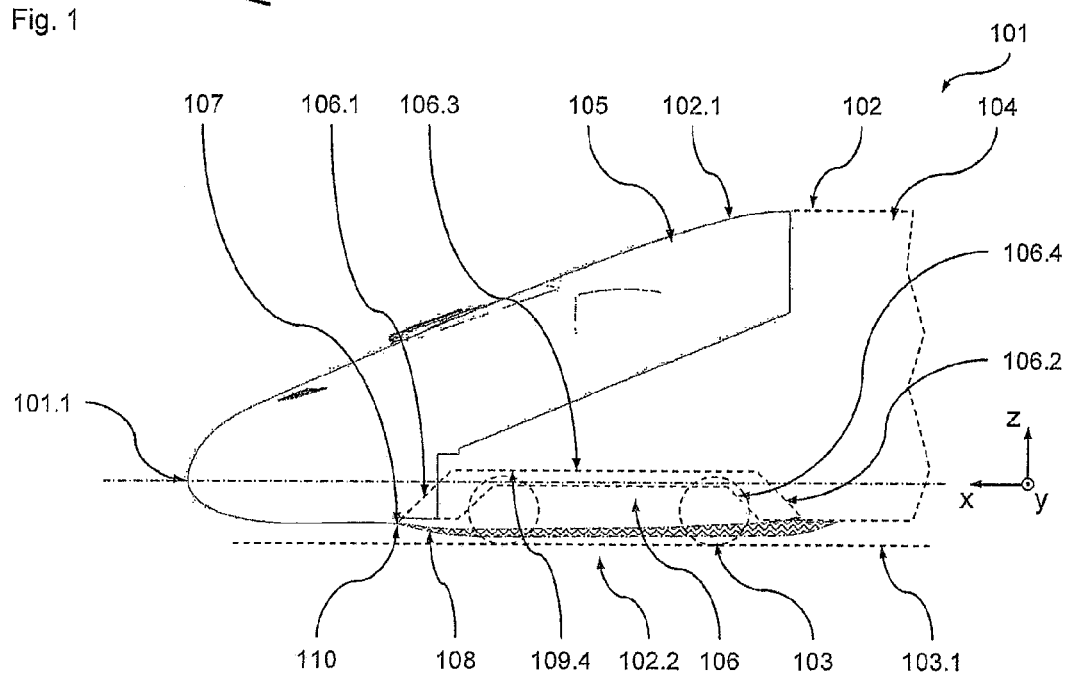
FIG. 2 is a schematic side view of the vehicle from FIG. 1.

A further advantageous embodiment of the vehicle component 104 according to the invention is described below with reference to FIGS. 1, 2 and 4. The vehicle component, in its basic design and functionality, corresponds to the vehicle component from FIGS. 1 to 3, such that only the differences will be addressed here. In particular, like components have references which are increased by 100. Unless otherwise specified, reference is made to the observations made above in the context of the first embodiment in terms of features, functions and advantages of these components.

Figure 4:
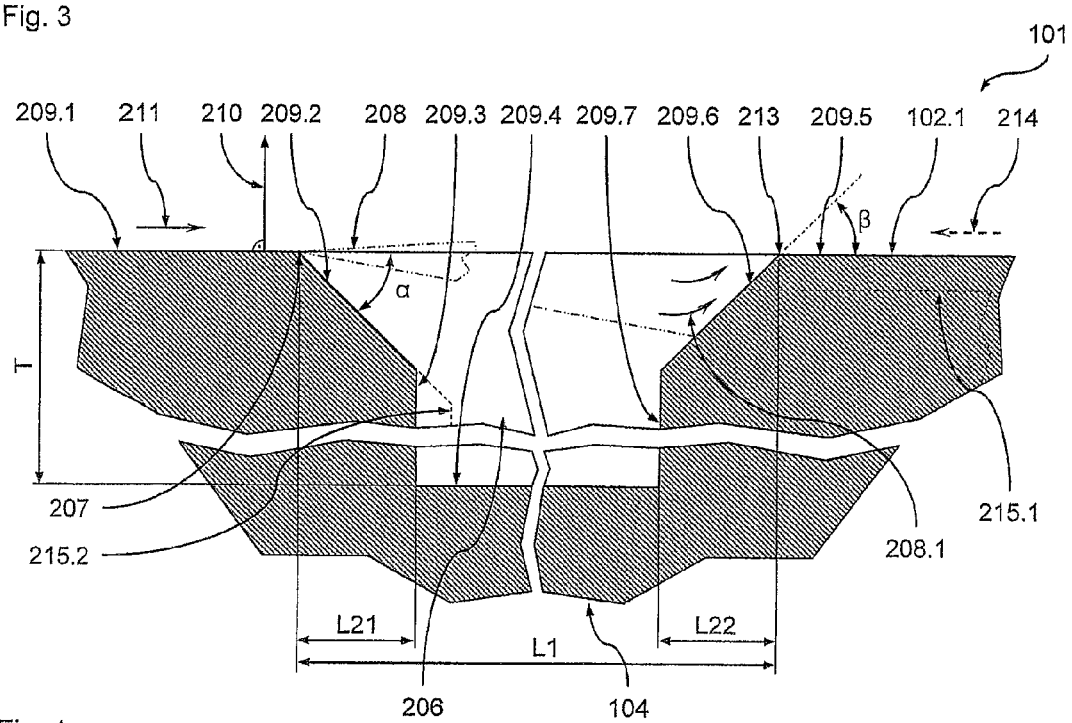
FIG. 4 is a schematic view of a part of a further preferred embodiment of the vehicle component according to the invention.

FIG. 4 is a section through the body section 104 which shows the vehicle component according to the invention in the region of a recess for a pantograph (not shown) in the roof region of the vehicle 101. The difference with respect to the embodiment shown in FIGS. 1 to 3 is that the third surface 209.3 which follows the second surface 209.2 and a seventh surface 209.7 which follows the sixth surface 209.6 are each inclined about an angle of 90° relative to the local main flow direction 211 or 214.

This design with the sharply inclined sections 209.3 and 209.7 has the advantage that it saves space in the longitudinal direction of the vehicle, since, with given dimensions of the pantograph, the flow separation edges 207 and 213 may be located closer to one another, therefore the entire recess 206 may be designed shorter in the longitudinal direction of the vehicle.

In order to achieve with this design the above mentioned advantages in terms of the smoother impact of the shear layer 208 on the surface 209.6 or 209.2, respectively, trailing in the respective operating mode, the respective (second) longitudinal dimension L21 or L22, respectively, of the second surface in the local main flow direction 211 or 214 is adapted to the free flow distance L1 of the shear layer between the first edge 207 and the second edge 213 of the recess 206 (hence, to the maximum first longitudinal dimension L1 of the recess 206), such that 100% of the part of the shear layer 208 penetrating into the recess 206 impinges on the sixth surface 209.6 or the second surface 209.2, respectively, in the respective operating mode. This ensures in an advantageous manner that the entire part of the shear layer 208 flowing into the recess impinges on the favourably designed second surface.

In the present example, the respective second longitudinal dimension L21 or L22 is approximately 5% of the first longitudinal dimension L1. It is understood, however, that in other variants of the invention a different length ratio of the respective second longitudinal dimension L21 or L22 to the first longitudinal dimension L1 can be provided. Particularly advantageous designs result from the length ratios mentioned initially.

It should be noted at this point that the length ratio, in particular in designs in which further components such as bogies etc. are arranged in the recess, at which, eventually even multiple times, sequential reattachment and re-separation of the flow occurs, generally decreases with large first longitudinal dimensions L1, since the shear layer impinging on the trailing edge is then generally only expanded to a limited extent such that, in a relation to the first longitudinal dimension L1, a shorter second or sixth surface, respectively, is sufficient in order to collect the shear layer smoothly.

It will be appreciated that the second longitudinal dimension L21 or L22, respectively, can deviate from the design described, if there is a difference in level between the first edge of the recess (in the region of the first wall) and the second edge of the recess (in the region of the second wall) transverse to the local main flow direction, as shown in FIG. 4 by the dotted contours 215.1 and 215.2. If the leading edge is at a higher level than the trailing edge, then a lower proportion of the shear layer 208 penetrates into the recess such that, eventually, a shorter (sixth) surface (see contour 215.1) is sufficient to collect this lower proportion completely. In the opposite direction of travel, eventually, a longer (second) surface (see contour 215.2) must be provided in order to achieve the desired effect.

Furthermore, in the local normal plane and perpendicular to the local main flow direction 211, the recess 206, starting from the flow separation edge 207, has a maximum first depth dimension T1 while, in the local normal plane and perpendicular to the local main flow direction 211, the second surface 209.2, starting from the flow separation edge 207, extends over a second depth dimension T21, which is 1% of the first depth dimension T1.

It is understood, however, that in other variants of the invention, a ratio of the second depth dimension T21 to the first depth dimension T1 which deviates from this can also be provided. Particularly advantageous designs arise from the above mentioned depth ratios.

In further variants of the invention the recess 206 can also be a gap between two separate components arranged on the vehicle 101, such as roof or underfloor containers. The flow separation edge 207 is then formed on the one container while the flow separation edge 213 is formed on the other container.

In further variants of the invention at least a part of the vehicle component according to the invention is not a component of the wagon body of the vehicle 101 but, for example, a component of a running gear of the vehicle 101. So, for example, it can be provided that the flow separation edge 207 is formed on the wagon body of the vehicle 101 while the flow separation edge 213 is formed on an adjacent component of the bogie 103. It is also possible for the two flow separation edges 207 and 213 to be formed on one or a plurality of adjacent components of the bogie 103. The two flow separation edges 207 and 213 can also be formed on additional add-on parts of the vehicle such as pantographs etc.

Third Embodiment

A further advantageous embodiment of the vehicle component 304 according to the invention is described below with reference to FIGS. 1, 2 and 5. The vehicle component 304, in its basic design and functionality, corresponds to the vehicle component 104 of the second embodiment from FIGS. 1, 2 and 4, such that only the differences will be addressed here. In particular, like components have references which are increased by 100. Unless otherwise specified, reference is made to observations made above in the context of the second embodiment in terms of features, functions and advantages of these components.

Figure 5:
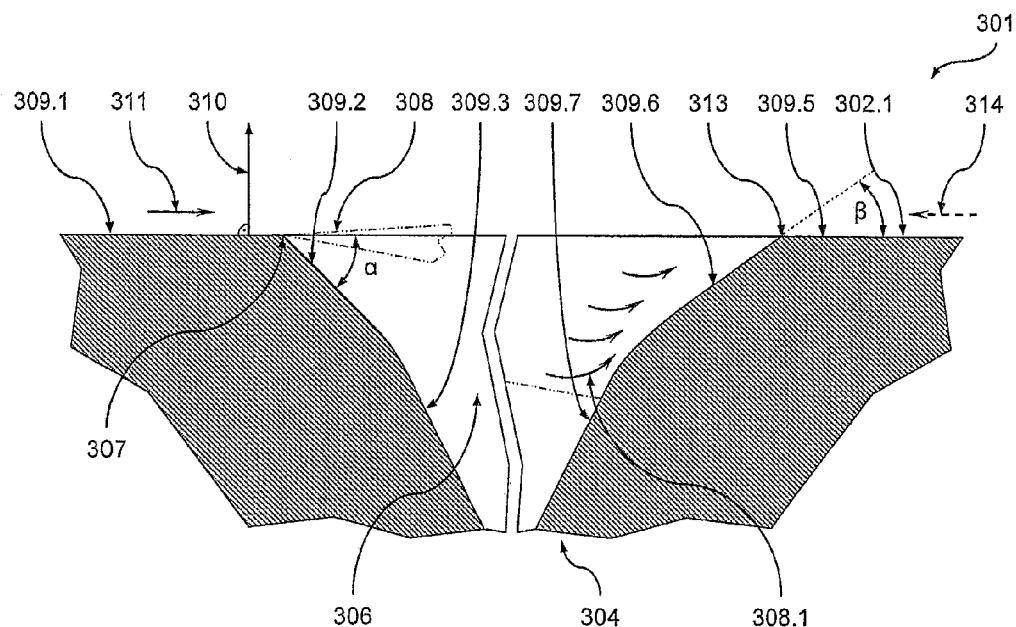
FIG. 5 is a schematic view of a part of a further preferred embodiment of the vehicle component according to the invention.

FIG. 5 is a section through the body section 304 (which essentially corresponds to the body section 104 and represents the vehicle component according to the invention) in the region of a recess 306 for a pantograph (not shown) in the roof region of the vehicle 301.

A difference to the embodiment in FIG. 4 is that the third surface 309.3 which follows the second surface 309.2 and the seventh surface 309.7 which follows the sixth surface 309.6 (instead of) 90° are each inclined on the one hand by an angle of around 65° relative to the local main flow direction 211 and 214. On the other hand, the respective transition between the second surface 309.2 and the third surface 309.3 and the transition between the sixth surface 309.6 and the seventh surface 309.7 are convexly curved, such that they each result in a combination of a sectional contour which is section-wise straight and a sectional contour which is section-wise curved.

This design has that advantage that the shear layer 308, even when it (as shown in FIG. 5 for the first operating mode) does not completely impinge on the sixth surface 309.6 or the second surface 309.2, respectively, is still collected just as smoothly thanks to the inclination of the third surface 309.3 and the seventh surface 309.7, respectively, and thanks to the curvature of the transitions. Accordingly, as shown in FIG. 5, it is possible without noteworthy losses to select the longitudinal dimensions L21 and L22 such that only around 70% of the shear layer 308 penetrating into the recess 306 impinge on the sixth surface 309.6 or the second surface 309.2, respectively.

A further difference to the embodiment from FIG. 4 is that the angle of inclination is selected to be β=35°, which is 10° lower than the angle of inclination α=45°. This asymmetric design accounts for the fact that the pantograph is provided close to a free end of a comparatively long vehicle 301.

If this vehicle end forms the leading end of the vehicle in the first operating mode, in this case the clean separation of the flow at the leading first edge 307 of the recess 306 is particularly important in terms of a low flow resistance and a low noise emission, as is a smooth and rapid reattachment of the flow at the trailing second edge of the recess, such that a second angle of inclination which is as low as possible in the region of the second edge 313 is advantageous. In the second operating mode in the opposite direction of travel, the recess 306 is then at the trailing end of the vehicle 301 where a comparatively broad boundary layer has already formed around the vehicle 301 due to the length of the vehicle 301, which reduces the above mentioned problems when the air flows over the recess 306, such that the steep shape of the second surface 309.2 on impact of the flow plays a less significant role.

Fourth Embodiment

A further advantageous embodiment of the vehicle component according to the invention is described below with reference to FIGS. 1, 2 and 6. The vehicle component 416, which is a side wall of the head section 105, in its basic design and functionality, corresponds to the vehicle component 104 of the second embodiment from FIGS. 1, 2 and 4, such that only the differences will be addressed here. In particular, like components are provided with references which are increased by 200. Unless otherwise specified, reference is made to the observations made above in the context of the second embodiment in terms of features, functions and advantages of these components.

Figure 6:
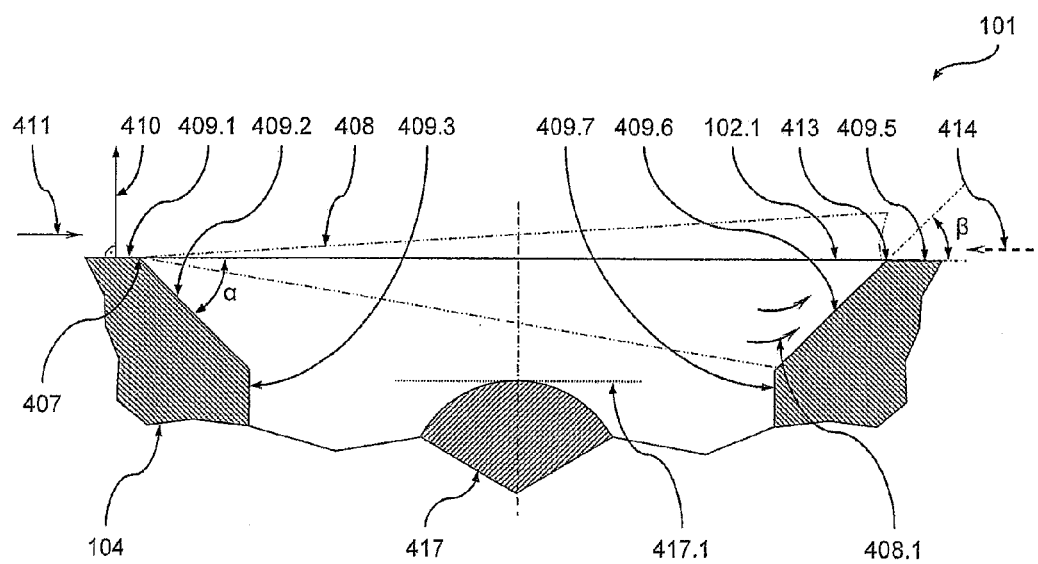
FIG. 6 is a schematic view of a part of a further preferred embodiment of the vehicle component according to the invention.

FIG. 6 is a section through the side wall 416 of the head section 105 in the region of a recess 406 for a handle rod 417 in the region of a driver's door (not shown) of the vehicle 101. The only difference to the design from the second embodiment, except for the dimensions of the recess 406, is the fact that the handle rod 417 is retracted into the recess 406 such that its outer tangent plane 417.1, transverse to the respective main flow direction 411 or 414, respectively, (in the depth direction of the recess 406) is at a deeper or more internally located level than the respective transition between the second surface 409.6 and the third surface 409.7 and the transition between the sixth surface 409.6 and the seventh surface 409.7.

In addition to the above mentioned advantages of the chamfered shape, this design also has the advantage that the handle rod 417 does not interfere with the shear layer 418, such that no further disturbance is introduced into the flow by the handle rod, which disturbance could hinder or delay fast reattachment to the outer skin.

The recess does not necessarily have to be confined transverse to the local main flow direction by a wall. In certain embodiments of the invention, however, a fourth surface is provided which is connected to the third surface and forms a delimitation of the recess in a depth direction of the recess.

Fifth Embodiment

A further advantageous embodiment of the vehicle component according to the invention is described below with reference to FIGS. 1, 2 and 7. The vehicle component 516, which is a transition between two wagon bodies 104.1 and 104.2 of the body section 104, in its basic design and functionality, corresponds to the vehicle component 104 of the second embodiment from FIGS. 1, 2 and 4, such that only the differences will be addressed here. In particular, like components are provided with references which are increased by 300. Unless otherwise specified, reference is made to the observations made above in the context of the second embodiment in terms of features, functions and advantages of these components.

Figure 7:
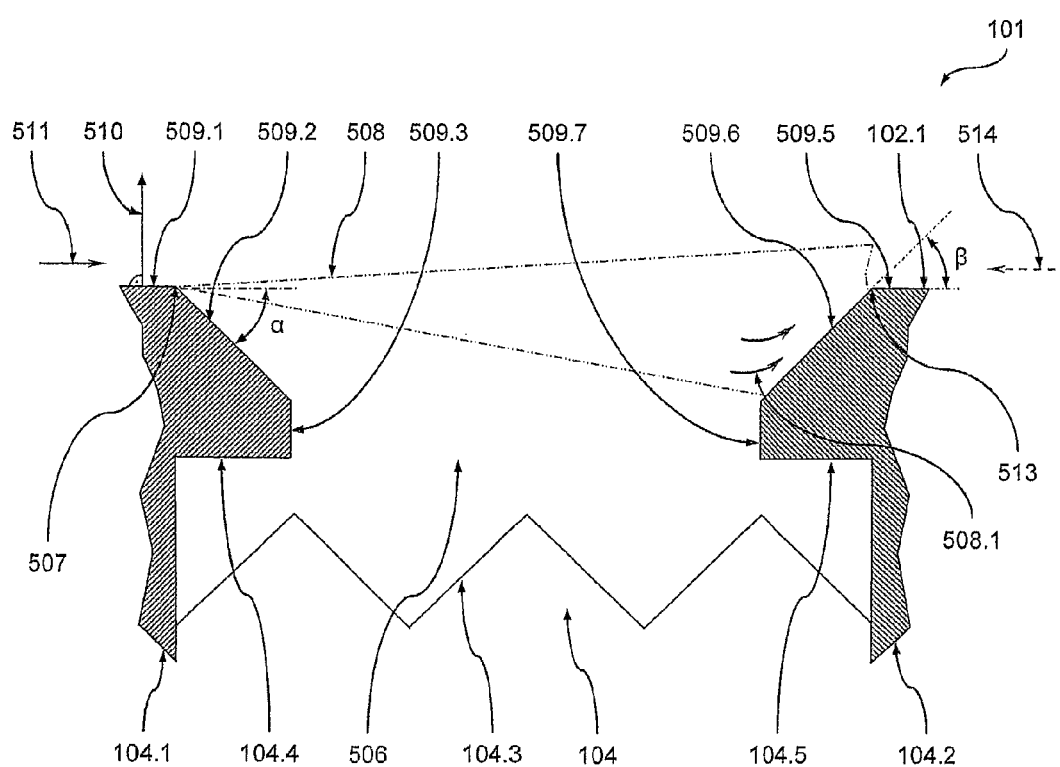
FIG. 7 is a schematic view of a part of a further preferred embodiment of the vehicle component according to the invention.

FIG. 7 is a section through the transition between the wagon bodies 104.1 and 104.2, which, for example, are connected by means of a bellows which is indicated schematically by contour 104.3. The first to third surface 509.1 to 509.3 is arranged on a first protrusion 104.4 of the wagon body 104.1 which extends in the longitudinal direction of the vehicle, while the fifth to seventh surface 509.5 to 509.7 is arranged on a second protrusion 104.5 of the wagon body 104.2 which, in the longitudinal direction of the vehicle, extends in an opposite direction.

This design makes it possible to achieve the above mentioned advantages in terms of reducing the flow resistance and reducing the noise emission even in the region of a transition of this type between wagon bodies. The formation of a protrusion of the respective wagon body also predestines this solution for the retrofitting of existing wagon bodies.

The present invention was described above on the basis of examples of specific vehicle components. It is understood, however, that the solution according to the invention can also be used for any other components which are a recess or a gap between two walls over which an air flow induced by relative wind flows.

The present invention was described above exclusively using examples of vehicles for multiple units. It is understood, however, that the invention can be used in combination with other rail vehicles. Furthermore, the invention was described exclusively in combination with rail vehicles. It is understood, however, that it can be used in combination with any other vehicles to reduce noise emissions. ***

The invention claimed is:

1. A vehicle component for a vehicle, comprising:
a first surface, and
a second surface, wherein
said first surface, in a first operating mode of said vehicle with a first travel direction, is exposed to an air flow induced by a relative wind and having a local main flow direction,
said first surface, in a region of a recess at said vehicle, forms a flow separation edge, at which air flow, at a nominal operating speed of said vehicle, separates from said first surface,
said recess is confined by a first wall leading in said local main flow direction and a trailing second wall,
said flow separation edge extends at least over a majority of a transverse dimension of said recess, transverse to said local main flow direction,
said second surface, in said local main flow direction, is located adjacent to said flow separation edge, and
said second surface forms at least a part of said first wall, and
said second surface is arranged to be inclined in a manner of a chamfer about an acute angle of inclination relative to said local main flow direction, said angle of inclination being 10° to 60°;
wherein,
said first surface, in the region of said flow separation edge, defines a local first tangent plane and a local surface normal,
said second surface, in the region of said flow separation edge, defines a local second tangent plane,
said local surface normal together with said local main flow direction defines a local normal plane,
said local second tangent plane, in said local normal plane, is inclined to said local first tangent plane about said acute angle of inclination,
said recess, in said local normal plane and in said local main flow direction, has a maximum first longitudinal dimension between said flow separation edge and said second wall, and
said second surface, in said local normal plane and in said local main flow direction, extends over a second longitudinal dimension, wherein:
said second longitudinal dimension is 1% to 30% of said first longitudinal dimension, or
said second longitudinal dimension is selected such that at least 50% of the part of a shear layer penetrating into said recess impinges on said second surface when said vehicle is travelling in an opposite second travel direction.

2. The vehicle component according to claim 1, wherein said acute angle of inclination is 30° to 60°.

3. The vehicle component according to claim 1, wherein:
said recess, in said local normal plane and starting from said flow separation edge, has a maximum first depth dimension perpendicular to said local main flow direction, and
said second surface, in said local normal plane and starting from said flow separation edge and in a direction perpendicular to said local main flow direction, extends over a second depth dimension, which second depth dimension is 1% to 40% of said first depth dimension.

4. The vehicle component according to claim 1, wherein:
said second surface at least section-wise has a substantially straight sectional contour in said local normal plane, or
said second surface at least section-wise has a curved sectional contour in said local normal plane.

5. The vehicle component according to claim 1, wherein:
said flow separation edge has sharp edges, wherein the radius of curvature of said first surface, in said region of said flow separation edge and in said local normal plane, in particular, has a maximum of 20 mm, or
said flow separation edge extends over at least 50% of said transverse dimension of said recess.

6. The vehicle component according to claim 1, wherein:
in said local main flow direction, a third surface follows said second surface, wherein:
said third surface is more strongly inclined with respect to said local main flow direction than said second surface, or
said third surface has a smooth, at least section-wise curved or at least section-wise straight transition to said second surface, or
said third surface has an at least section-wise convex transition to said second surface, or
a fourth surface is provided which is located adjacent to said third surface and forms a limitation of said recess in a depth direction of said recess.

7. The vehicle component according to claim 1, wherein:
in a region of said second wall, a fifth surface and a sixth surface are provided, wherein:
said fifth surface is formed such that, in a second operating mode of said vehicle in a second travel direction which differs from said first travel direction, said fifth surface corresponds to said first surface in terms of shape and function, and
said sixth surface is formed such that, in said second operating mode, said sixth surface corresponds to said second surface in terms of shape and function.

8. The vehicle component according to claim 7, wherein:
said angle of inclination between said first surface and said second surface is a first angle of inclination, and
said sixth surface is arranged inclined to said fifth surface in a manner of a chamfer about an acute second angle of inclination, wherein:
said second angle of inclination is 10° to 80°, or
said second angle of inclination is smaller than said first angle of inclination.

9. The vehicle component according to claim 1, wherein:
said recess is a running gear cutout of a wagon body of said vehicle, or
said recess is a handle cavity in a side wall of a wagon body of said vehicle, wherein a hand rod is provided in said handle cavity in a retracted arrangement, or
said recess is an indentation in a roof area of a wagon body of said vehicle, wherein said indentation is configured to receive a component of a power supply unit of said vehicle.

10. The vehicle component according to claim 1, wherein:
said recess is a notch in an outer skin of said vehicle at a transition between two wagon bodies of said vehicle, and said first surface and said second surface are formed on a protrusion of a wagon body in a longitudinal direction of said vehicle.

11. The vehicle component according to claim 1, wherein:
said recess is a gap between two roof containers or two underfloor containers, on at least one wagon body of said vehicle, or
said recess is a gap between a wagon body of said vehicle and a running gear of said vehicle.

12. The vehicle component according to claim 1, wherein said vehicle component is a running gear of said vehicle.

13. A vehicle with a vehicle component according to claim 1, wherein said vehicle is a vehicle for high speed traffic with a nominal operating speed above 250 km/h.

* * * * *